(12) United States Patent
Gunyakti et al.

(10) Patent No.: US 8,181,265 B2
(45) Date of Patent: May 15, 2012

(54) SECURE MACHINE COUNTING

(75) Inventors: Caglar Gunyakti, Sammamish, WA (US); Ronald W. Miller, Sammamish, WA (US); Xiaoxi (Michael) Tan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1758 days.

(21) Appl. No.: 11/227,528

(22) Filed: Sep. 15, 2005

(65) Prior Publication Data

US 2006/0036552 A1 Feb. 16, 2006

Related U.S. Application Data

(63) Continuation-in-part of application No. 11/089,071, filed on Mar. 24, 2005, now Pat. No. 7,644,442, which is a continuation-in-part of application No. 10/356,225, filed on Jan. 31, 2003, now Pat. No. 7,356,709.

(51) Int. Cl.
*G06F 7/04* (2006.01)

(52) U.S. Cl. ........... 726/31; 726/26; 726/29; 726/33; 705/56; 705/57

(58) Field of Classification Search ........... 726/26–33; 705/56–57
See application file for complete search history.

(56) References Cited

U.S. PATENT DOCUMENTS

| | | |
|---|---|---|
| 4,688,169 A | 8/1987 | Joshi .................. 364/200 |
| 5,138,712 A | 8/1992 | Corbin |
| 5,182,770 A | 1/1993 | Medveczky et al. .......... 380/4 |
| 5,204,897 A | 4/1993 | Wyman |
| 5,260,999 A | 11/1993 | Wyman |
| 5,319,705 A | 6/1994 | Halter et al. |
| 5,443,036 A * | 8/1995 | Amiss et al. .............. 119/707 |
| 5,509,070 A * | 4/1996 | Schull ..................... 705/54 |
| 5,553,139 A | 9/1996 | Ross et al. |
| 5,742,757 A | 4/1998 | Hamadani et al. |
| 5,745,879 A | 4/1998 | Wyman |
| 5,754,763 A | 5/1998 | Bereiter |
| 5,845,065 A | 12/1998 | Conte et al. |
| 5,903,650 A | 5/1999 | Ross et al. |
| 5,905,860 A | 5/1999 | Olsen et al. |
| 5,935,243 A | 8/1999 | Hasebe et al. |
| 6,006,035 A | 12/1999 | Nabahi et al. |

(Continued)

FOREIGN PATENT DOCUMENTS

JP 7-110767 A 4/1995

(Continued)

OTHER PUBLICATIONS

"Microsoft Technet: Activation and Registration Associated with a New Installation or an Upgrade" Published Aug. 6, 2004 http://technet.microsoft.com/en-us/library/bb457159.aspx.*

(Continued)

*Primary Examiner* — Kim Vu
*Assistant Examiner* — Thomas Gyorfi
(74) *Attorney, Agent, or Firm* — Woodcock Washburn LLP

(57) ABSTRACT

A method and computer-readable medium for deterring software piracy in a volume license environment. An activation bypass message is generated and sent. Information contained in the activation bypass message is compared to a list of machine identifiers. A binding service message contains a count of the machine identifiers in the list. Once the count reaches a predetermined threshold, software activation bypass may occur.

20 Claims, 5 Drawing Sheets

U.S. PATENT DOCUMENTS

| | | | |
|---|---|---|---|
| 6,023,766 A | 2/2000 | Yamamura | |
| 6,059,838 A | 5/2000 | Fraley et al. | |
| 6,067,622 A | 5/2000 | Moore | 713/200 |
| 6,108,420 A | 8/2000 | Larose et al. | |
| 6,134,324 A | 10/2000 | Bohannon et al. | |
| 6,134,659 A | 10/2000 | Sprong et al. | |
| 6,169,976 B1 | 1/2001 | Colosso | |
| 6,188,995 B1 | 2/2001 | Garst et al. | |
| 6,189,146 B1 | 2/2001 | Misra et al. | |
| 6,223,288 B1 | 4/2001 | Byrne | |
| 6,226,747 B1 | 5/2001 | Larsson et al. | |
| 6,263,492 B1 | 7/2001 | Fraley et al. | |
| 6,343,280 B2 | 1/2002 | Clark | |
| 6,368,227 B1 * | 4/2002 | Olson | 472/118 |
| 6,385,726 B1 | 5/2002 | Hasebe et al. | |
| 6,460,140 B1 | 10/2002 | Schoch et al. | |
| 6,615,359 B2 | 9/2003 | Eyres et al. | |
| 6,799,277 B2 | 9/2004 | Colvin | |
| 6,810,389 B1 | 10/2004 | Meyer | |
| 6,842,896 B1 | 1/2005 | Redding et al. | |
| 6,859,793 B1 | 2/2005 | Lambiase | |
| 6,920,567 B1 | 7/2005 | Doherty et al. | |
| 6,948,168 B1 | 9/2005 | Kuprionas | |
| 7,024,696 B1 | 4/2006 | Bahar | |
| 7,035,918 B1 | 4/2006 | Redding et al. | |
| 7,111,285 B2 | 9/2006 | Smith et al. | |
| 7,228,567 B2 | 6/2007 | Serkowski et al. | |
| 7,356,709 B2 | 4/2008 | Gunyakti et al. | |
| 7,530,117 B2 * | 5/2009 | Tanaka et al. | 726/31 |
| 7,644,442 B2 | 1/2010 | Miller et al. | |
| 2001/0034712 A1 | 10/2001 | Colvin | |
| 2002/0016846 A1 | 2/2002 | Ono | |
| 2002/0161718 A1 | 10/2002 | Coley et al. | |
| 2002/0162016 A1 * | 10/2002 | Colvin | 713/200 |
| 2003/0050895 A1 | 3/2003 | Dedrick et al. | |
| 2003/0088516 A1 | 5/2003 | Remer et al. | |
| 2003/0149670 A1 | 8/2003 | Cronce | |
| 2003/0156719 A1 | 8/2003 | Cronce | |

FOREIGN PATENT DOCUMENTS

| | | | |
|---|---|---|---|
| JP | 11-238038 A | 8/1999 |
| JP | 2000-47870 A | 2/2000 |
| JP | 2002-297255 A | 10/2002 |
| JP | 2003-22140 A | 1/2003 |
| WO | WO 00/75760 A1 | 12/2000 |

OTHER PUBLICATIONS

Xin Wang, Guillermo Lao, Thomas DeMartini, Hari Reddy, Mai Nguyen, Edgar Valenzuela. XrML—eXtensible rights Markup Language, Proceedings of the 2002 ACM workshop on XML security, Nov. 22-22, 2002, Fairfax, VA.*

Wikipedia article for "Botnet", originally published Aug. 28, 2005. (2 pages) http://en.wikipedia.org/w/index.php?title=Botnet&oldid=22048020.*

Keizer, Gregg. "More Than 1 Million Bots on the Attack" Published Mar. 16, 2005 on informationweek.com (3 pages) http://www.informationweek.com/news/security/showArticle.jhtml?articleID=159901082.*

"Protecting the office from Cyber-attack" Published Sep. 22, 2004 at cnn.com (2 pages) http://edition.cnn.com/2004/BUSINESS/09/13/go.cyber.security/.*

Leyden, John. "Hackers plot to create massive botnet" Published Jun. 3, 2005 at channelregister.co.uk (2 pages) http://www.channelregister.co.uk/2005/06/03/malware_blitz/.*

In the United States Patent and Trademark Office, Non-Final Office Action in re:. U.S. Appl. No. 11/089,071, filed Mar. 24, 2005, dated Mar. 4, 2009, 13 pages.

Musich, P. "MSPs Make Big Deals—As Customers' Needs Change, Small Companies License Software, Team with Larger Vendors", *EWEEK*, 2002, 19(26) (Jul. 1) 23.

Schulz, N. "E-Journal Databases: A Long-Term Solution?", *Library Collections Acquisitions & Technical Services*, 2001, 25(4), 449-459.

Kang, W.J. et al., "Dynamic License Control System for an On-line Circulation of Digital Product in Electronic Commerce", *Proceedings of the IASTED International Conference. Internet and Multimedia Systems and Applications*, 2000, 140-144.

* cited by examiner

SECURE MACHINE COUNTING

CROSS REFERENCE TO RELATED APPLICATIONS

This application is a continuation-in-part of U.S. patent application Ser. No. 11/089,071, filed Mar. 24, 2005, now U.S. Pat. No. 7,644,442, titled "Systems And Methods For Using Machine Attributes To Deter Software Piracy In An Enterprise Environment," which, in turn, is a continuation-in-part of U.S. patent application Ser. No. 10/356,225, filed Jan. 31, 2003, now U.S. Pat. No. 7,356,709, titled "Systems And Methods For Deterring Software Piracy in a Volume License Environment." The disclosure of the above-referenced applications is hereby incorporated by reference as if set forth fully herein.

BACKGROUND

Software piracy is a worldwide problem that costs software vendors large sums of money every year. One form of piracy, known as casual copying, is sharing and installing software on multiple computers, in violation of the end user license agreement. Product activation is one way to reduce this type of piracy.

Product activation commonly relies on the submission of an installation identification code and/or a hardware identifier to the software vendor. The software vendor in response returns an activation confirmation code. In a typical retail application of product activation, a unique product key is provided with each package of boxed software. Typically, during or after some grace period, (a period of time after installation of software during which the software will run without being activated), a customer must contact the software vendor to activate his or her copy of the software. Failure to do so frequently results in deactivation of the software or in degraded functionality of the software. Typically, the unique product key is used to generate a unique product identification code, which may be combined with a hashed hardware-related value to generate an installation identification code that is specific to the machine on which the software runs. An activation confirmation that enables the software to run is typically returned to the customer. In this regard, an activation confirmation can also be a license file, or a binary that represents a license. At each login the licensed software checks to see that it is running on essentially the same hardware on which it was activated. If the check fails, reactivation is required before the software will run again.

Corporate customers commonly purchase a volume license, because it is not feasible for corporate customers—who may have hundreds or thousands of machines in their domain—to contact the software vendor for each software copy installed to receive a machine-specific activation code. Typically, therefore, holders of volume licenses do not have to contact the software vendor to activate their software, because the software bypasses the activation requirement when a volume license key is detected. This is known as a "product activation bypass." Hence, the same volume license key can be used on many different computers, none of which require activation in order for the software to run, before or after the grace period has expired. Although this feature makes volume license keys more convenient for a corporate customer to install software, it is also an attractive target for piracy. For example, pirates obtain legitimate volume licensing media and buy or steal valid volume licensing product keys. The media and product keys are repurposed and sold to unsuspecting customers in a scheme known as "business to consumer" channel piracy.

Thus, there is a need for a mechanism for deterring piracy in a networked computing environment without unduly burdening legitimate customers with cumbersome anti-piracy requirements. The present invention satisfies this need.

SUMMARY

In view of the above shortcoming and drawbacks, an embodiment incorporates a software activation bypass mechanism into a volume licensing environment. According to such an embodiment, a policy that specifies a minimum number of machines that need to be present on a customer network in order for proper activation bypass of the software application to occur is provided with a software application. One computer within a network is designated as a binding service machine, and other computers on which a software application is to be installed are clients. At some point, each client attempts to perform an activation bypass of the software. To do so, the client generates an activation bypass message containing a machine identifier, a timestamp and information relating to the software application, and sends the message to the binding service machine.

Upon receipt of the activation bypass message, the binding service machine checks the machine identifier against a list of all such received machine identifiers. If the machine identifier is not present in the trust store, it is added. The binding service machine counts the number of unique machine identifiers in the list and enters the count into a binding service message, which is sent to the client. Upon receipt of the binding service message, the client determines whether the count satisfies the policy and, if so, the machine is able to activate the software.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION

Overview

An embodiment incorporates a software activation bypass mechanism into a volume licensing environment. The activation bypass mechanism does not require the customer to contact the software vendor. According to such an embodiment, a policy is provided with a software application. The policy specifies a minimum number of machines that need to be present on a customer network in order for proper activation bypass of the software application to occur. One computer within a network is designated as a binding service machine. Other computers on which a software application is to be installed are clients. A copy of the software application is installed on each computer (i.e., the binding service machine and the clients, for example) and at some point (e.g., at logon), each client attempts to perform activation bypass of the software. To do so, the client generates an activation bypass message containing a machine identifier, a timestamp and information relating to the software application, and sends the message to the binding service machine.

Upon receipt of the activation bypass message, the binding service machine checks the machine identifier against a trust store that contains a list of all such received machine identifiers. If the machine identifier is not present in the trust store, it is added. The binding service machine counts the number of unique machine identifiers in the trust store and enters the count into a binding service message, which is sent to the client. Upon receipt of the binding service message, the client determines whether the count satisfies the policy (i.e., whether the minimum number of machines has been met). If so, the machine is able to enable activation bypass of the software. Otherwise, the software remains inactive and continues operating in a "grace" period, if applicable.

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
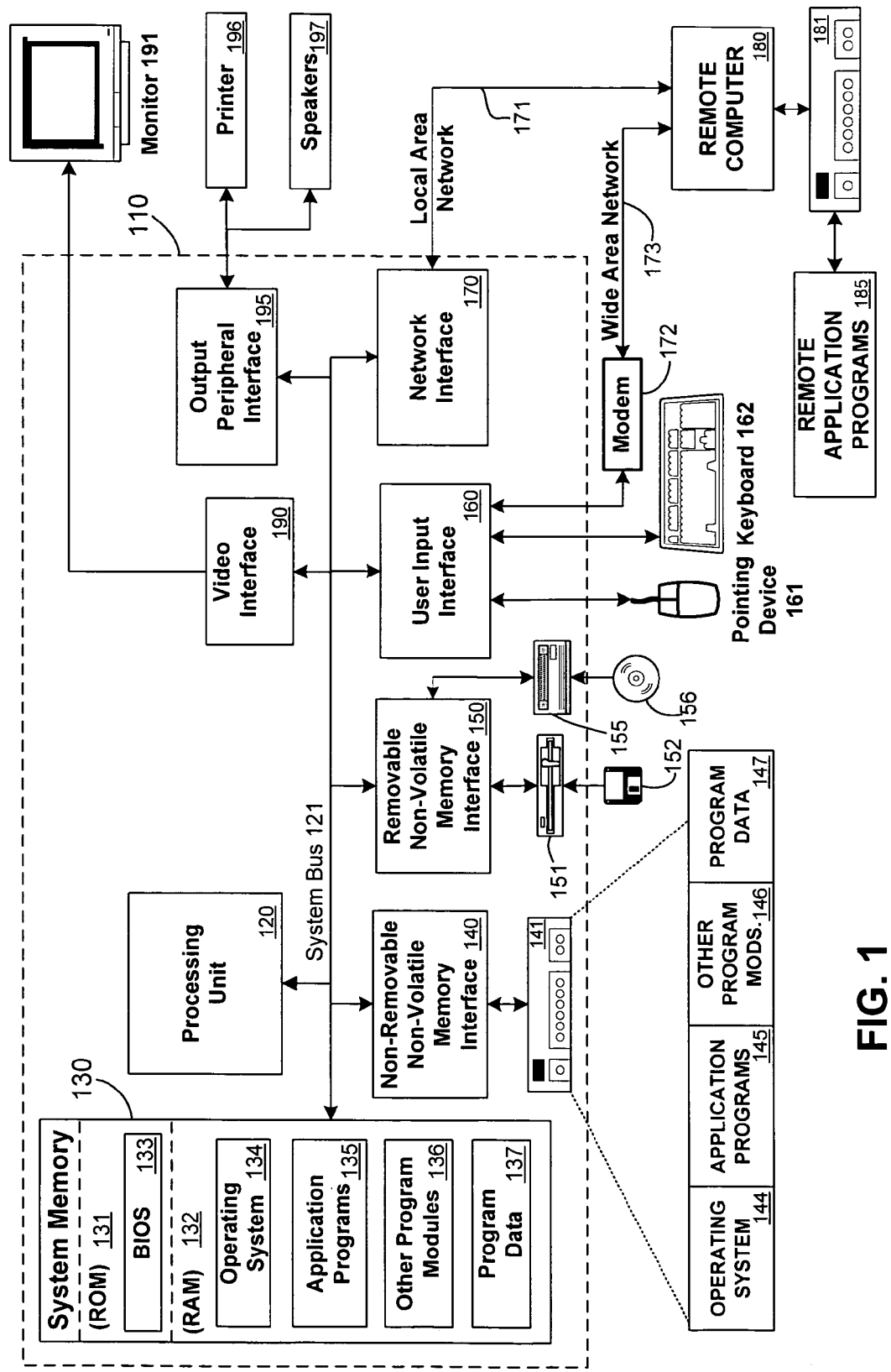
FIG. 1 is an example computing environment in which aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Typically the functionality of the program modules may be combined or distributed as desired in various embodiments. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention includes a general purpose computing device in the form of a computer 10. Components of computer 110 may include, but are not limited to, a processing unit 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146 and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are example and other means of establishing a communications link between the computers may be used.

Example Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While example embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

EXAMPLE EMBODIMENTS

In the discussion that follows, it is assumed that details relating to implementing secure communication between computers in a computer network in a software activation context are known to one skilled in the art. Accordingly, such details are omitted herein for clarity.

In an embodiment, volume licensed software is provided that has an associated policy. The policy specifies the number of machines that need to be present in a customer's network for proper activation bypass of the software to occur. This policy data may be written into, for example, a signed eXtensible rights Markup Language (XrML) file that can be authenticated by machines within the customer's network. One computer within a network is designated as a binding service machine. This designation may be made by, for example, the customer, software vendor, the software application itself, or the like. Other computers on which a software application is to be installed are clients. A copy of the software application is installed on each computer (i.e., the binding service machine and the clients, for example) and at some point (e.g., at logon), each client attempts to activate the software.

A unique machine attribute such as, for example, a processor identifier or the like, in addition to any other security measures, may be used as a machine identifier to protect a communication path between a computer seeking activation bypass of the software and a computer providing a binding service to enable such activation bypass. A client seeking to activate its copy of the software generates an activation bypass message containing its machine identifier, a timestamp, information relating to the software application and a machine authentication code (MAC), and then sends the message to the binding service machine. By using a MAC, an embodiment enables messages of the client and the binding service (discussed in detail below) to be authenticated through the message itself. In such a manner, the authentication of such messages can be self contained, rather than having to rely on a communication layer between the client and the binding service. Once the message is delivered to the binding service, the binding service examines the message to ensure that the timestamp and MAC are valid.

Upon receiving and verifying the authenticity of the message, the binding service checks the machine identifier against a queue of known machines and if the machine identifier is not found it is added to the queue. The binding service then counts the number of unique machine identifiers in the queue and sends an authenticated reply message that includes the count to the client. The client determines whether the count satisfies the policy (i.e., whether the minimum number of machines has been met). If so, the machine is able to enable activation bypass of the software. Otherwise, the software remains inactive and continues operating in a "grace" period, if applicable.

Thus, it will be appreciated that an embodiment requires, prior to allowing an activation bypass of a volume licensed software application to occur, that a customer effectively verify that the software application is, in fact, being used in a network of computers. An embodiment requires that the network have a certain minimum number of machines on which the software will undergo activation bypass, and uses machine-specific identifiers to obtain an accurate count. While an embodiment does not require that the software be installed on a specific set of machines, the requirement that a certain number of machines be present in the network effectively counteracts most software pirates' intentions. Namely, a software pirate is unlikely to set up a network having the required number of machines just for the purpose of illicitly running the software application, particularly if the required number of machines is especially large. This is especially true of any individuals who may—unsuspectingly or otherwise—purchase a pirated copy of the software application. It will be appreciated that if the minimum number of machines is set as a fixed number, a certain tradeoff may need to be made with respect to security and user-friendliness. For example, setting the number too low will likely not achieve beneficial security results, while setting the number too high may cause problems for legitimate customers.

By using a binding service machine to generate the machine count, the client is not able to forge the count to bypass the activation requirement. In addition, the use of a count is a lightweight and reliable way to determine whether the software application is being used in a computer network as intended. As noted above, one embodiment simply checks that a specified number of different machines are present within the target network. As a result, the same software may be sold by the software vendor to different customers without having to update or modify the software, as would be the case if the software was to be tailored to a specific network. Thus, in an embodiment, a sensible balance is struck between high security and deterrence to piracy and ease of installation and activation on the part of a legitimate customer. It will be appreciated that this balance may be altered according to vendor and/or customer needs.

Figure 2A:
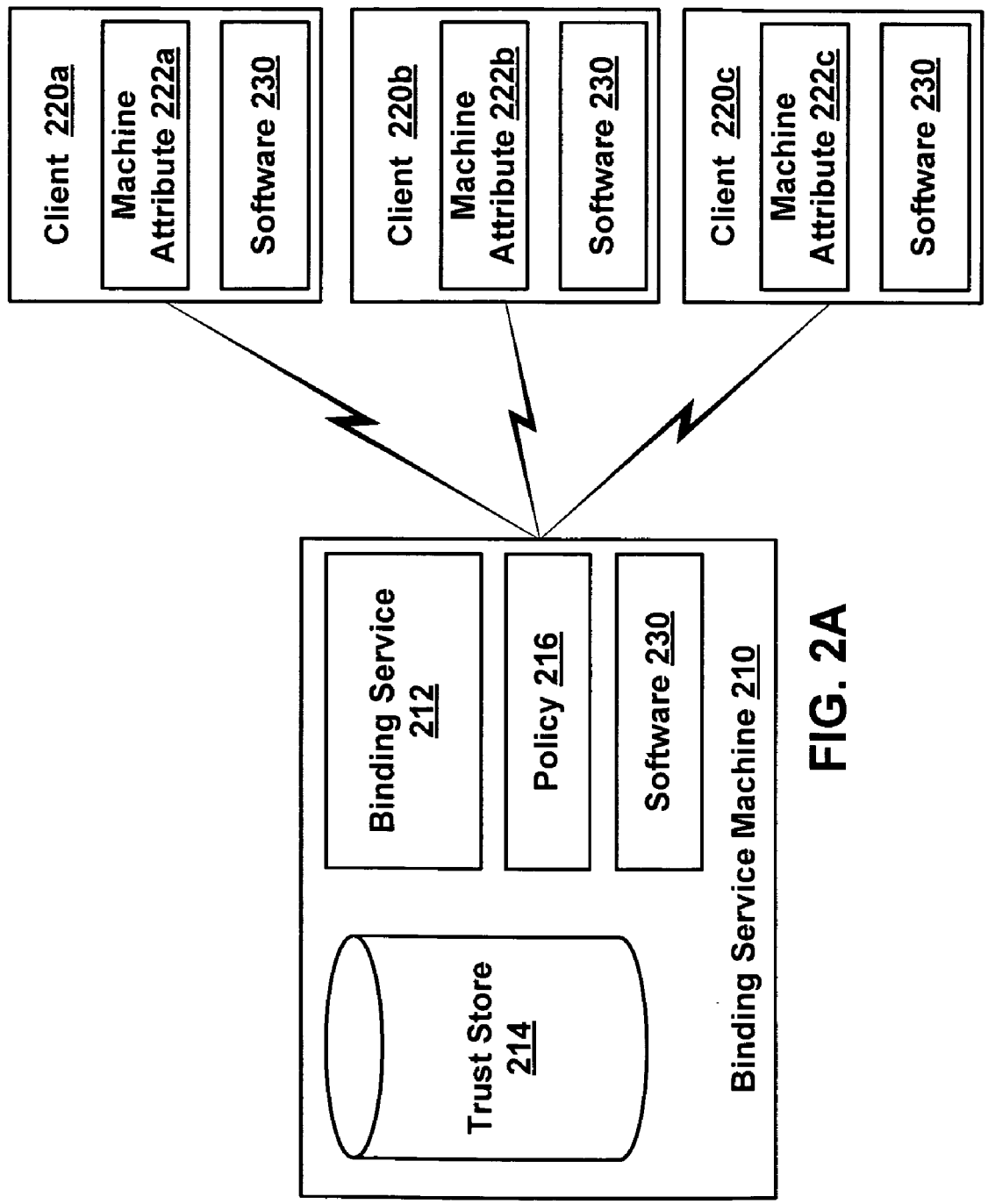
FIG. 2A is a block diagram illustrating an example network in which software piracy may be deterred in accordance with an embodiment.

FIG. 2A is a block diagram of an example network in which software piracy may be deterred in accordance with an embodiment. Clients 220*a-c* may be any type of computing device within the network. Each client 220*a-c* includes a copy of software 230 and a respective machine attribute 222*a-c*. A software vendor may provide a volume license holder with a copy of software 230 on some media such as, but not limited to, a CD-ROM, or directly by way of a network, such as those described above in connection with FIG. 1. Accompanying software 230 may be an enterprise-specific or volume-license-holder-specific volume license key (VLK) (not shown). In one embodiment, the VLK may be embedded within a relatively large file, called a license file. The machine attribute 222*a-c* of its respective client 220*a-c* may be any type of data that identifies a hardware device associated with client 220*a-c*. For example, machine attribute 222*a* may be a processor identifier of client 220*a* or the like. In an embodiment, the type(s) of machine attributes 222*a-c* used for each client 220*a-c* are the same (e.g., each client 220*a-c* uses its processor identifier as its machine attribute 222*a-c*). In other embodiments, each client 220*a-c* may use a different machine attribute 222*a-c*.

As noted above, one computer within the network may be designated as binding service machine 210. Binding service machine 210 may be a stand-alone machine, or may also be a client 220. In other words, a client, such as client 220*a*, and binding service machine 210 may be hosted by the same machine, or may be on different machines. Binding service machine 210 contains binding service 212, which may be, for example, a process that runs within binding service machine 210 to carry out software activation bypass. In addition, binding service machine 210 contains policy 216, which designates the minimum number of unique machines that must be present within the network for software activation bypass to occur. The word "machine" may refer to any device within the network that is to install software 230. While "machine" may typically refer to a computer of some type (e.g., desktop, laptop, etc.), "machine" may also refer to a server, a device such as a PDA, etc. In addition, such a machine need not be continuously connected to the network (e.g., a laptop).

The number set within policy 216 may be set arbitrarily, varied on a case-by-case basis, set according to a certain type of customer (e.g., corporate customers), set according to the size of the network or the like. For example, the policy may be set to require that 25 unique machines be present within the network prior to allowing software activation bypass. Trust store 214 contains a queue of all machines that have attempted to activate the software. The queue may represent machines as a machine identifier (as will be discussed below) or, for example, as an entry comprising the machine identifier and additional information. Such additional information may be, for example, a timestamp or the like. Trust store 214 may be a trust store file, which is a key database file that contains one or more encryption keys. The key is stored as a signer certificate and can be used for a variety of purposes, such as validating the data contained therein. Thus, trust store 214 can be a secure, "trusted" location for the machine identifiers and any additional information.

As noted above, to activate its copy of software 230, client 220a-c sends an activation bypass message to binding service machine 210. Any type of activity may trigger such activation bypass such as, for example, the occurrence of an event (e.g., login, startup of software 230, etc.), at user direction, after an elapsed time, etc. Prior to successfully completing activation bypass of software 230, software 230 may operate in a "grace" period, within which full or partial functionality will be available to a user prior to activation bypass of software 230. In an embodiment, the use of a grace period is useful, as it may take some time before the number of client activation bypass attempts populate the queue in trust store 214 to the required number of machines. Thus, while the queue is building up to the requisite number of machines, the customer's users may still be able to use software 230. As the activation bypass process may be completely automated in an embodiment, the use of a grace period may render the activation bypass process effectively invisible to a user of one of clients 220a-c.

Figure 2B:
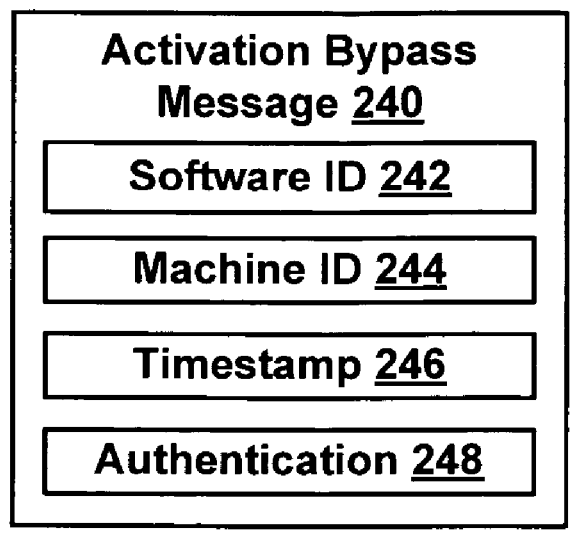
FIG. 2B is a block diagram of an example activation bypass message that may be used in accordance with an embodiment.

FIG. 2B is a block diagram of an example activation bypass message 240 that may be used in accordance with an embodiment. Activation bypass message 240 may be formatted in accordance with any appropriate secure messaging format. Activation bypass message 240 includes software identifier 242, which designates the software for which activation bypass is desired. Software identifier 242 may, in an embodiment, contain a software identifier, version number and/or the like. Thus, if multiple software applications are to undergo activation bypass according to an embodiment, the activation bypass process of each application may be kept separate so as to avoid interfering with the other activation bypass processes.

Activation bypass message 240 may also include machine identifier 244, which may be formed from, for example, machine attribute 222a-c as discussed above in connection with FIG. 2A. For example, a machine attribute 222a-c may be hashed, encrypted and/or the like to form machine identifier 244. Alternatively, machine identifier 244 may simply comprise machine attribute 222a-c without further processing or change. Activation bypass message 240 may further include timestamp 246. Timestamp 246 may be used to protect the software from "replay" attacks and the like because the hardware binding that is facilitated by machine identifier 244 is known to be current. Finally, activation bypass message 240 may include authentication 248 that may be carried out by, for example, a message authentication code (MAC) or the like. Although not shown in FIG. 2B for clarity, activation bypass message 240 may include additional fields such as, for example, information relating to policy 216.

Figure 2C:
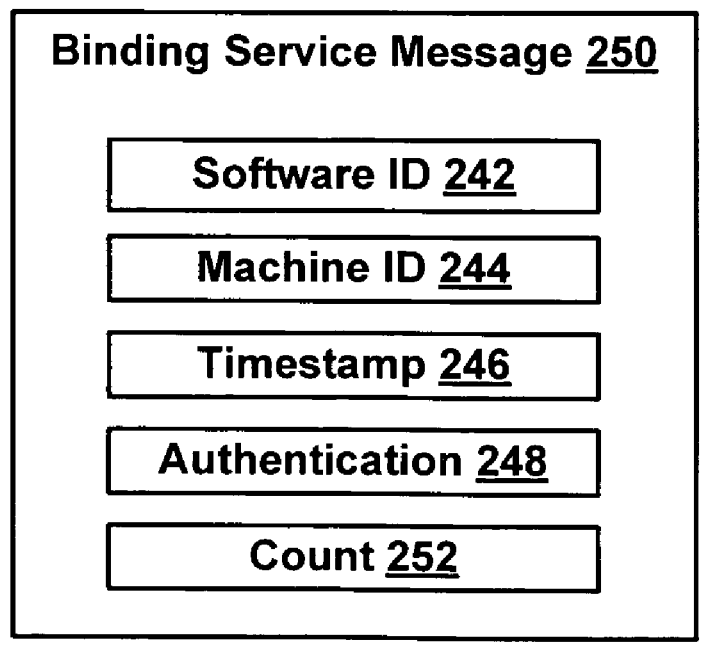
FIG. 2C is a block diagram of example binding service message that may be used in accordance with an embodiment.

FIG. 2C is a block diagram of example binding service message 250 that may be used in accordance with an embodiment. Binding service message 250, like activation bypass message 240 discussed above in connection with FIG. 2B, contains software identifier 242, machine identifier 244 (identifying the client), timestamp 246 (e.g., the timestamp used in activation bypass message 240) and authentication 248. Authentication 248 may be carried out in the same manner as authentication 248 of activation bypass message 240, or may be carried out in accordance with a different protocol. In addition, binding service message 250 includes count 252, which corresponds to the number of unique machine identifiers listed within the queue of trust store 214, discussed above in connection with FIG. 2A. Although not shown in FIG. 2C for clarity, binding service message 250 may include further fields such as, for example, information relating to policy 216.

Figure 3:
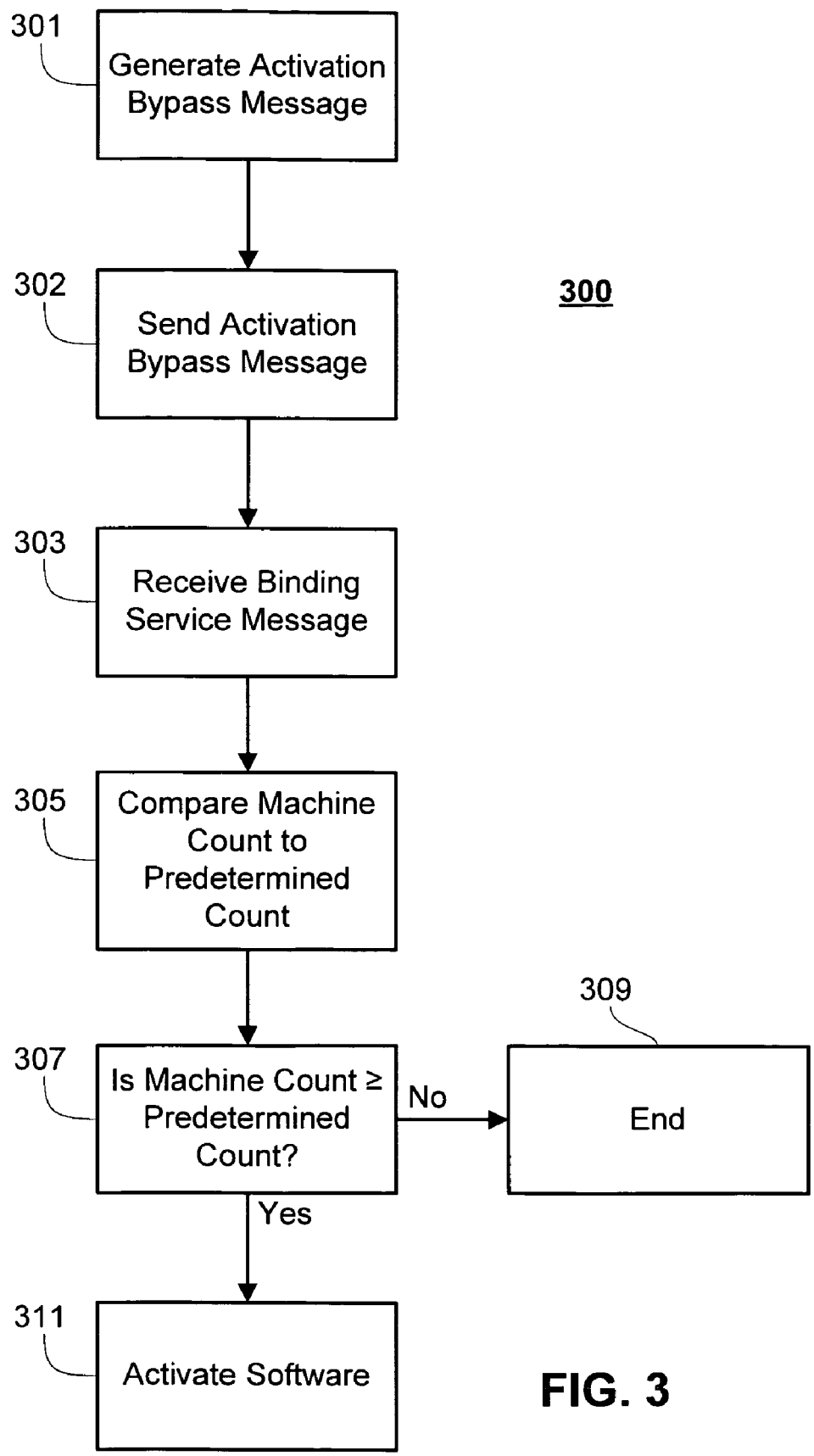
FIG. 3 is a flowchart illustrating an example client method of allowing activation bypass of software in accordance with an embodiment.

FIG. 3 is a flowchart illustrating an example client method of activating software in accordance with an embodiment. It will be appreciated that method 300 may be initiated and/or performed during setup or can be performed at a later time (e.g., login). Method 300 may take place with the aid of, for example, an unattended file. An unattended file is a text file that is used in conjunction with a software setup routine to bypass normal setup prompts (to perform unattended installation). An unattended file can, for example, enter a VLK automatically, configure proxy settings and auto-activate the system on behalf of the end user, either through the target machine's local area network (LAN), via the Internet, etc. Activation bypass can also be performed after setup using command-line scripts.

At step 301, a client activation bypass message, such as activation bypass message 240 discussed above in connection with FIG. 2B, is generated by a client. The client activation bypass message may be generated either upon initial installation of the software, upon the client determining that the current volume license for an already-installed software application is no longer valid or the like. At step 302, the activation bypass message is sent to a binding service machine. Step 302 may occur immediately after step 301, or after a delay. For example, if the client is a laptop computer that is currently disconnected from the network, the activation bypass message may be generated when a user starts up the computer. Once the user reconnects the client laptop computer to the network, the activation bypass message may be sent to the binding service machine. The timestamp discussed above in connection with FIG. 2B may therefore correspond to the time the activation bypass message was generated or sent, for example. At step 303, a binding service message, such as binding service message 250 discussed above in connection with FIG. 2C, is received by the client machine. An example method that involves the creation of a binding service message is discussed below in connection with FIG. 4.

At step 305, after any necessary message authentication processing, the count (such as count 252) is extracted from the binding service message and compared to a predetermined count associated with the client's copy of the software application. It will be appreciated that the predetermined count may correspond to policy 216 discussed above in connection with FIG. 2A. At step 307, a determination is made as to whether the received count is equal to or greater than the predetermined count. It will be appreciated that the policy may specify whether the predetermined count needs to be matched or exceeded.

If the received count is not equal to or greater than the predetermined count, as appropriate, then at step 309 method 300 ends. It will be appreciated that activation bypass of the client software copy does not occur because the binding service has not yet received the minimum number of unique machine identifiers required by the software's policy. A user may still be able to use the software if, for example, the software includes a "grace period" that allows use of the software without activation bypass for a given period of time.

If the received count is equal to or greater than the predetermined count, at step 311 the software allows activation bypass using a bypass mark in cooperation with a binding mechanism. This binding mechanism ensures that the activation bypass mark cannot be simply copied and used on another machine. In an embodiment, the binding mechanism is specific to each individual machine. In an embodiment, once step 311 has completed, the client will no longer need to contact the binding service machine for purposes of authenticating the software application. In an alternate embodiment, method 300 may be repeated at set or variable intervals. For example, if the machine identifiers contained in the trust store queue may have a specified lifespan, after which the machine identifiers are deleted from the queue. In such an embodiment, method 300 may be repeated at some interval to keep the queue (and its corresponding count) current.

It will be appreciated that when the software is first installed, there will likely be no listed machines in the queue of the trust store. For example, when the first client attempts to perform activation bypass of its copy of the software, the binding service will access the trust store to determine whether the client is listed within the queue contained therein. Because no clients have previously attempted to perform activation bypass on their copy of the software, no clients would be listed in the trust store until the first client is added. If the predetermined count has not been reached, a client machine may continue to function in the grace period. Beyond the grace period, the client machine may function in a reduced functionality mode or the end user may request an extension from the software vendor.

Figure 4:
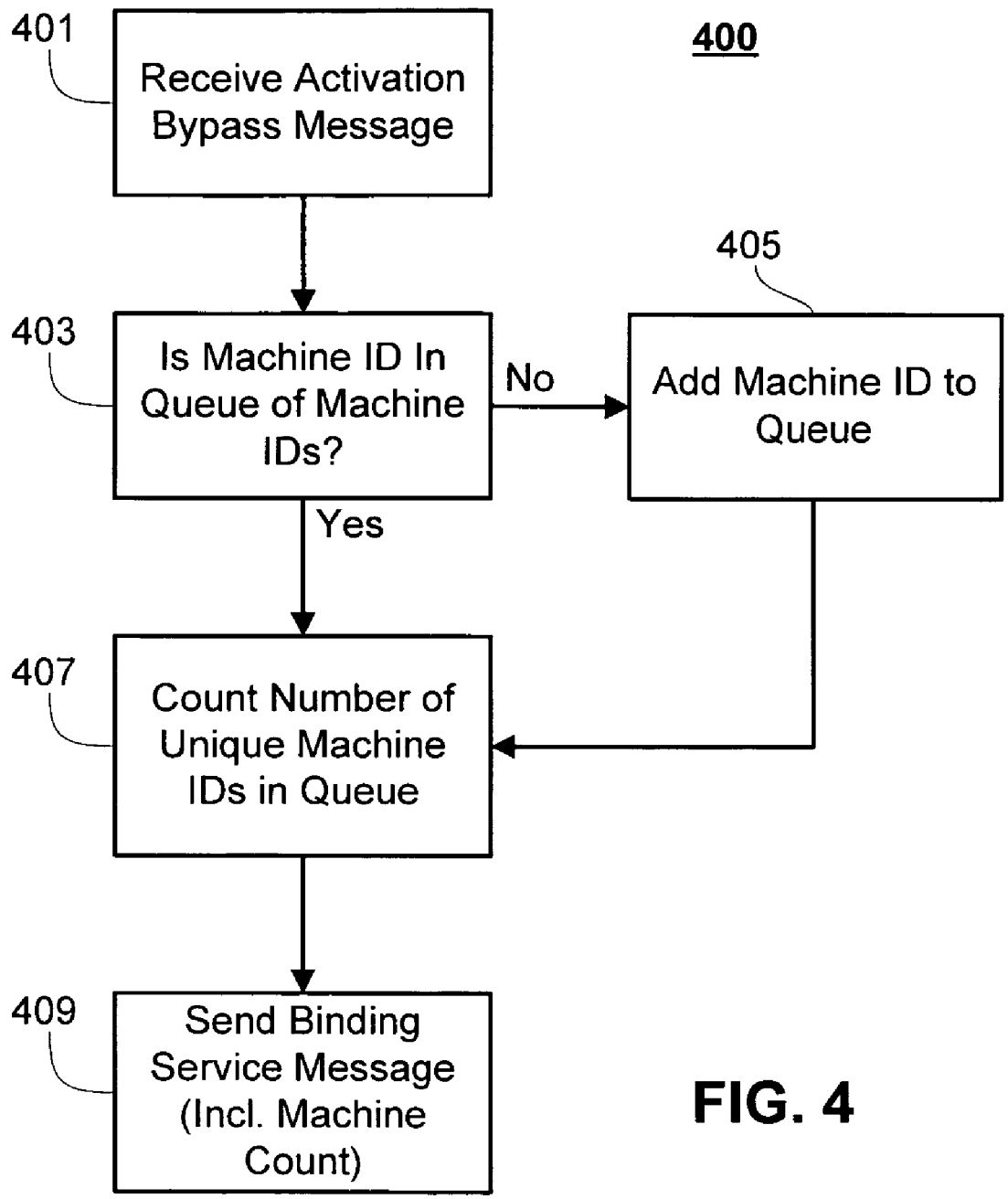
FIG. 4 is a flowchart illustrating an example binding service method of activating software in accordance with an embodiment.

FIG. 4 is a flowchart illustrating example binding service method 400 of performing activation bypass of software in accordance with an embodiment. At step 401, an activation bypass message, such as activation bypass message 240 discussed above in connection with FIG. 2B, is received. After any appropriate message authentication processing is completed, at step 403 the machine identifier contained within the activation bypass message is compared to any machine identifiers contained within the queue of the binding service machine's trust store to see if the machine identifier is present within the queue. If the machine identifier is already present, method 400 proceeds to step 407, to be discussed momentarily. Alternatively, in an embodiment where timestamps are used, prior to proceeding to step 407 the machine identifier stored in the list may be replaced with the just-received machine identifier. In such a manner, the list will contain the most-recently received machine identifier. If the machine identifier is not already present, at step 405 the machine identifier is added to the queue. In some instances, additional information may be stored in the queue along with the machine identifier. For example, a timestamp may be stored so as to avoid replay attacks from a potential software pirate.

At step 407, the number of machine identifiers in the queue are counted. It will be appreciated that because method 400 only places a machine identifier in the queue if that machine identifier is not already present, the queue holds unique machine identifiers (i.e., each machine identifier is stored once, regardless of how many times a particular client has sent an activation bypass message). At step 409, a message that includes the count is sent to the client that sent the activation bypass message received in step 401. In an embodiment, a machine identifier may be deleted from the queue after a predetermined time (not shown in FIG. 4). For example, the software application's policy may dictate that, rather than enabling activation bypass of the software once, the software should be periodically repeat the activation bypass process to ensure that the client is still part of the customer network. Thus, by deleting machine identifiers periodically, the count may fall below the number of machine identifiers required by the policy unless a sufficient number of clients are still present in the network (and sending activation bypass messages).

It will be appreciated that in such an embodiment client machines should be configured to periodically attempt to repeat the activation bypass process to ensure that the machine identifier count remains sufficiently high. In addition, if the client never attempts to repeat the activation bypass process, the software could remain activated even if the machine identifier count fell below the threshold.

It is noted that the foregoing examples have been provided merely for the purpose of explanation and are in no way to be construed as limiting of the present invention. It is also noted that there are a variety of ways of implementing the present invention, e.g., an appropriate API, tool kit, driver code, dynamic linked library (DLL), operating system, control, standalone or downloadable software object, etc. that enables applications and services to obtain licensing information according to the invention. Embodiments of the invention contemplate the use of the invention from the standpoint of an API (or other software object), as well as from a software or hardware object that communicates in connection with a VLK licensing technique as described herein. Thus, various implementations of the invention described herein may have aspects that are wholly in hardware, partly in hardware and partly in software, as well as in software.

As mentioned above, while example embodiments have been described in connection with various computing devices and network architectures, the underlying concepts may be applied to any computing device or system in which it is desirable to deter piracy. Thus, the techniques for encoding/decoding data in accordance with an embodiment may be applied to a variety of applications and devices. For instance, the algorithm(s) and hardware implementations of an embodiment may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While example programming languages, names and examples are chosen herein as representative of various choices, these languages, names and examples are not intended to be limiting. With respect to embodiments referring to the use of a control for achieving the invention, the invention is not limited to the provision of a .NET control, but rather should be thought of in the broader context of any piece of software (and/ore hardware) that achieves the piracy deterrent objectives in accordance with the invention. One of ordinary skill in the art will appreciate that there are numerous ways of providing object code and nomenclature that achieves the same, similar or equivalent functionality achieved by the various embodiments of the invention. An embodiment may be implemented in connection with an on-line auction or bidding site as well.

As mentioned, the various techniques described herein may be implemented in connection with hardware or software or, where appropriate, with a combination of both. Thus, the methods and apparatus of embodiments of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the piracy deterrent techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of embodiments of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in example embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while example network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A computer-readable storage medium having computer-executable instructions for performing steps comprising:
   generating an activation bypass message, wherein the activation bypass message comprises a machine identifier and a software identifier associated with a software application that is to undergo activation bypass;
   sending the activation bypass message to a binding service machine;
   receiving from the binding service machine a binding service message that comprises a machine count, the machine count representing a number of machines that have sent at least one activation bypass message to the binding service machine;
   comparing the machine count to a predetermined count representing a number of machines; and
   if the machine count is equal to or greater than the predetermined count, allowing activation bypass for the software application.

2. The computer-readable storage medium of claim 1, wherein the activation bypass message further comprises a timestamp indicating the time at which the activation bypass message was generated.

3. The computer-readable storage medium of claim 1, wherein the activation bypass message is sent by way of a computer network, and wherein the machine count corresponds to a number of machines present on the network that have sent at least one activation bypass message to the binding service.

4. The computer-readable storage medium of claim 3, wherein the activation bypass message is sent when a machine on which the activation of the software application is to be bypassed logs into the computer network.

5. The computer-readable storage medium of claim 4, wherein the machine identifier is derived from a hardware attribute of the machine on which the activation of the software application is to be bypassed.

6. The computer-readable storage medium of claim 1, wherein the predetermined count is defined by a policy associated with the software application.

7. The computer-readable storage medium of claim 6, wherein the activation bypass message further comprises the policy.

8. The computer-readable storage medium of claim 6, wherein the policy is stored as part of a signed extensible rights markup language file that is associated with the software application.

9. The computer-readable storage medium of claim 8, wherein said generating and sending steps are repeated at a predetermined interval.

10. The computer-readable storage medium of claim 1, wherein the activation bypass message further comprises a first message authentication code and the binding service message further comprises a second message authentication code, and further comprising authenticating the binding service message using the second authentication code.

11. A computer-readable storage medium having computer-executable instructions for performing steps comprising:
    receiving an activation bypass message from a client machine, wherein the activation bypass message comprises a client machine identifier and a software identifier associated with a software application having an activation requirement to be bypassed;
    determining whether the received client machine identifier is among a list of machine identifiers;
    if the received client machine identifier is not among the list of machine identifiers, adding the received client machine identifier to the list;
    determining a number of unique machine identifiers within the list; and
    sending a binding service message, wherein the binding service message comprises the number of unique machine identifiers.

12. The computer-readable storage medium of claim 11, wherein the activation bypass message further comprises a first message authentication code and the binding service message further comprises a second message authentication code, and further comprising authenticating the activation bypass message using the second authentication code.

13. The computer-readable storage medium of claim 11, further comprising deleting the received client identifier from the list after a predetermined time.

14. The computer-readable storage medium of claim 11, wherein the client machine identifier is derived from a hardware attribute of the client machine.

15. The computer-readable storage medium of claim 11, wherein the activation bypass message further comprises a timestamp indicating a time at which the activation bypass message was generated by the client machine.

16. The computer-readable storage medium of claim 15, wherein each machine identifier in the list of machine identifiers is represented as an entry comprising the machine identifier and an associated timestamp.

17. The computer-readable storage medium of claim 16, and further comprising, if the received client machine identifier is among the list of machine identifier entries, updating or replacing the entry with an entry corresponding to the machine identifier associated with the most recent timestamp.

18. A method of deterring piracy in a volume license environment, comprising:

generating an activation bypass message at a client machine, wherein the activation bypass message comprises a machine identifier and a software identifier associated with a software application the activation of which is to be bypassed;

sending the activation bypass message to a binding service machine;

determining, at the binding service machine, whether the received client machine identifier is among a list of machine identifiers;

if the received client machine identifier is not among the list of machine identifiers, adding, at the binding service machine, the received client machine identifier to the list;

determining, at the binding service machine, a number of unique machine identifiers within the list;

sending a binding service message to the client machine, wherein the binding service message comprises the number of unique machine identifiers;

comparing, at the client machine, the received number of unique machine identifiers to a predetermined count representing a number of machines; and if the received number of unique machine identifiers is equal to or greater than the predetermined count, allowing activation bypass for the software application.

19. The method of claim 18, further comprising deleting, at the binding service machine, the received client identifier from the list after a predetermined time and repeating, at the client machine, said generating and sending steps at a predetermined interval.

20. The method of claim 18, wherein the activation bypass message further comprises a first message authentication code and the binding service message further comprises a second message authentication code, and further comprising authenticating, at the binding service machine, the activation bypass message using the first authentication code, and authenticating, at the client machine, the binding service message using the second authentication code.

* * * * *